United States Patent [19]

Jacquier

[11] Patent Number: 5,061,340
[45] Date of Patent: Oct. 29, 1991

[54] DEVICE FOR FITTING AN EXTRACTION SLEEVE INTO A STEAM-GENERATOR TUBE AND CORRESPONDING PROCESS FOR THE EXTRACTION OF A TUBE PORTION

[75] Inventor: Paul Jacquier, Tassin La Demi-Lune, France

[73] Assignee: Framatome, Courbevoie, France

[21] Appl. No.: 422,710

[22] Filed: Oct. 17, 1989

[30] Foreign Application Priority Data

Oct. 17, 1988 [FR] France ............... 88 13655

[51] Int. Cl.⁵ ............................................. B23P 15/26
[52] U.S. Cl. ..................................... 156/578; 29/726
[58] Field of Search ............... 29/888.011, 889.722, 29/890.031; 156/578, 579, 344, 294, 98, 423

[56] References Cited

U.S. PATENT DOCUMENTS

| 4,571,821 | 2/1986 | Pirl et al. ............. | 29/890.031 |
| 4,776,072 | 10/1988 | Jacquier ............. | 29/890.031 |
| 4,831,720 | 5/1989 | Sherer et al. ......... | 29/890.031 |

FOREIGN PATENT DOCUMENTS

| 0005670 | 11/1979 | European Pat. Off. . |
| 0086341 | 8/1983 | European Pat. Off. . |
| 0186489 | 7/1986 | European Pat. Off. . |
| 0227535 | 7/1987 | European Pat. Off. . |
| 0298841 | 1/1989 | European Pat. Off. . |

Primary Examiner—David A. Simmons
Assistant Examiner—Robert Barker
Attorney, Agent, or Firm—Pollock, Vande Sande & Priddy

[57] ABSTRACT

The fitting device comprises a guide sleeve (75) having, at one of its ends, a profile complementary to a profile located at a first end of an extraction sleeve (85); a retention sleeve (100) having at one of its ends, a profile complementary to a profile located at the second end of the extraction sleeve (85), and an arrangement for fastening the retention sleeve (100) to the entry face (3a) of the tube plate (3). For the installation of the extraction sleeve (85) and for the installation, control and extraction of a glue-injecting syringe, the device also includes an actuating member (17) and an elongate transmission element (18) connected at one of its ends to the injection syringe and at its other end to the actuating member (17). The extraction sleeve (85) can be connected to the guide sleeve (75) and to the retention sleeve (100), in order to be installed inside the tube (5) to be extracted. The glue-injecting syringe is arranged inside the extraction sleeve (85) and is controlled manually by the actuating member (17) and the flexible transmission element (18). The invention also relates to a process for extracting a generator tube portion remote from the ends of the tube.

11 Claims, 14 Drawing Sheets

FIG_1

FIG_2

FIG_3

FIG_5

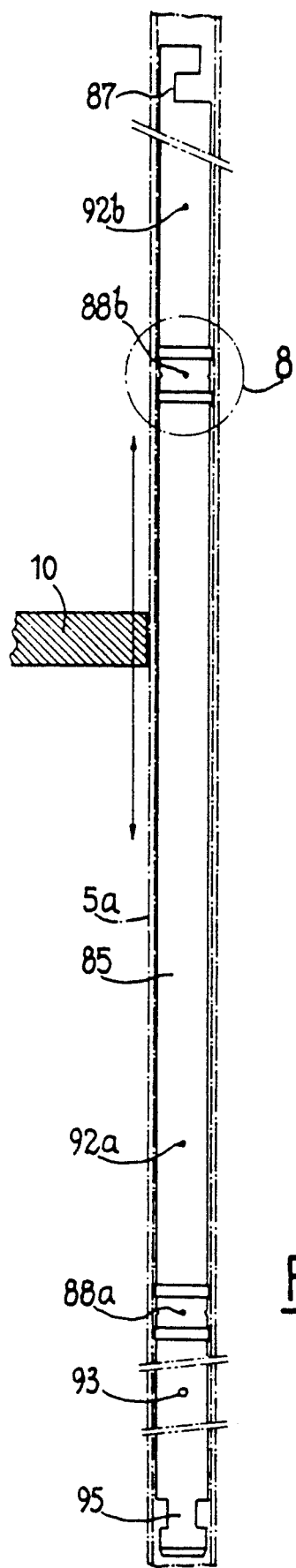
FIG_7
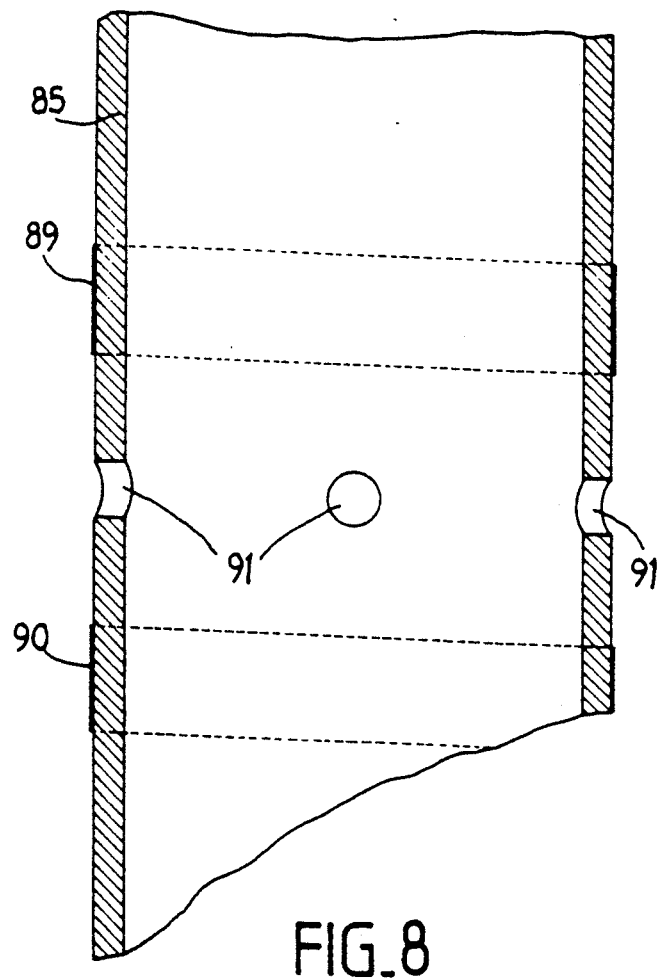
FIG_8

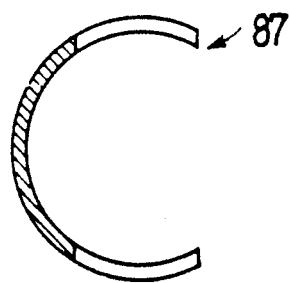
FIG_10
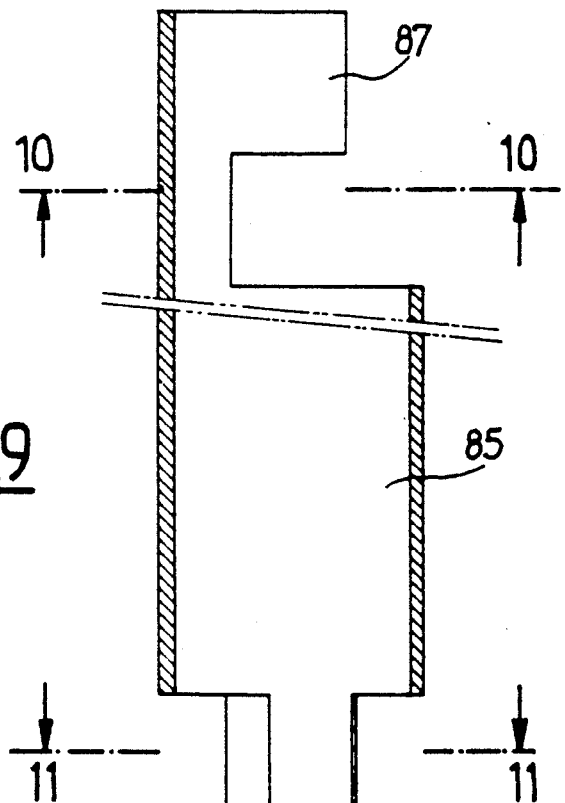
FIG_9
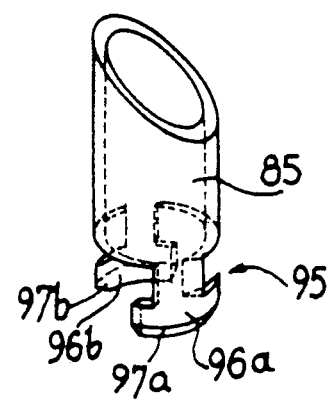
FIG_12
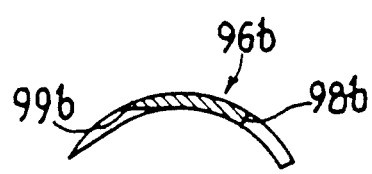
FIG_11

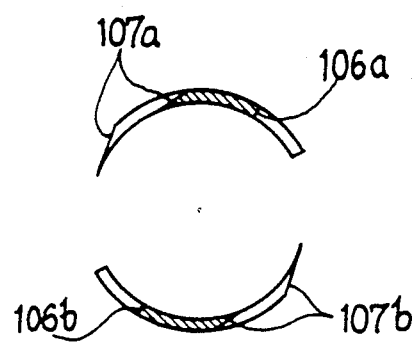
FIG_15
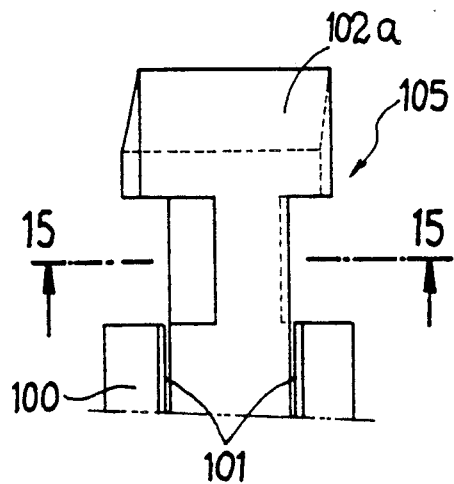
FIG_14
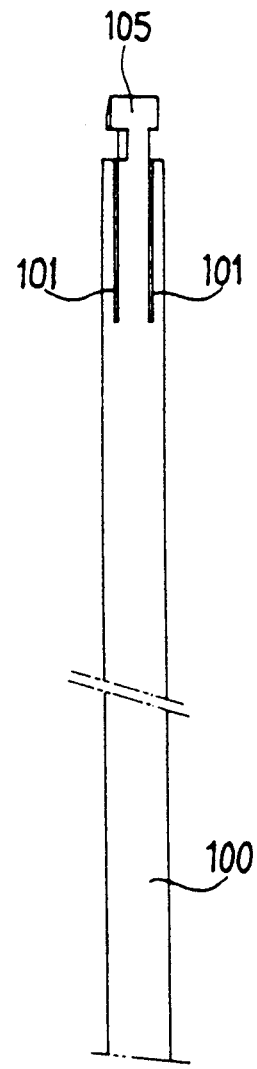
FIG_13
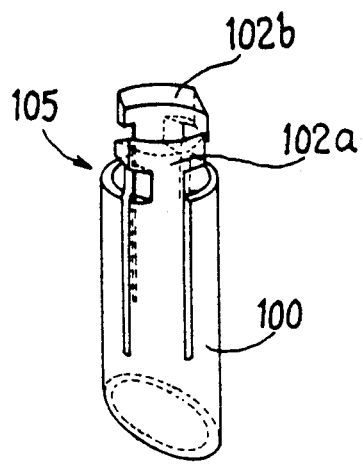
FIG_16

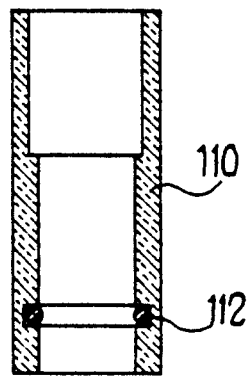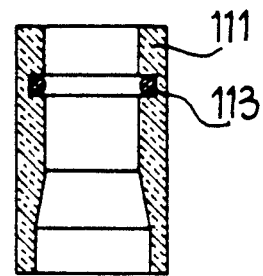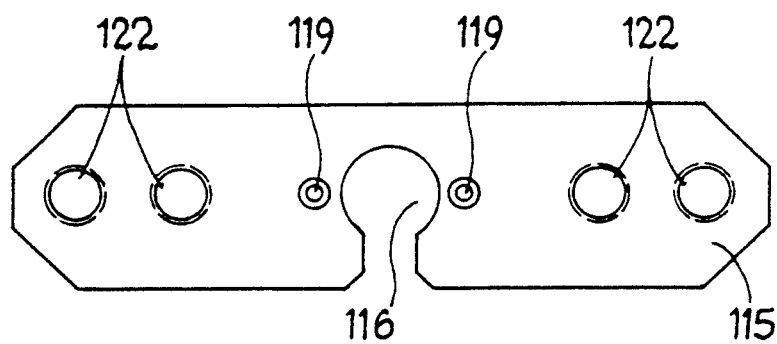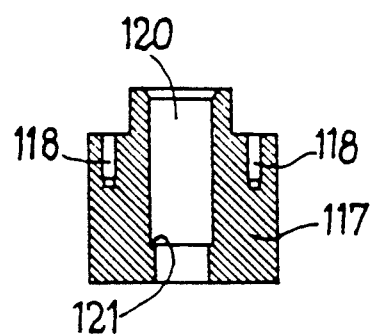

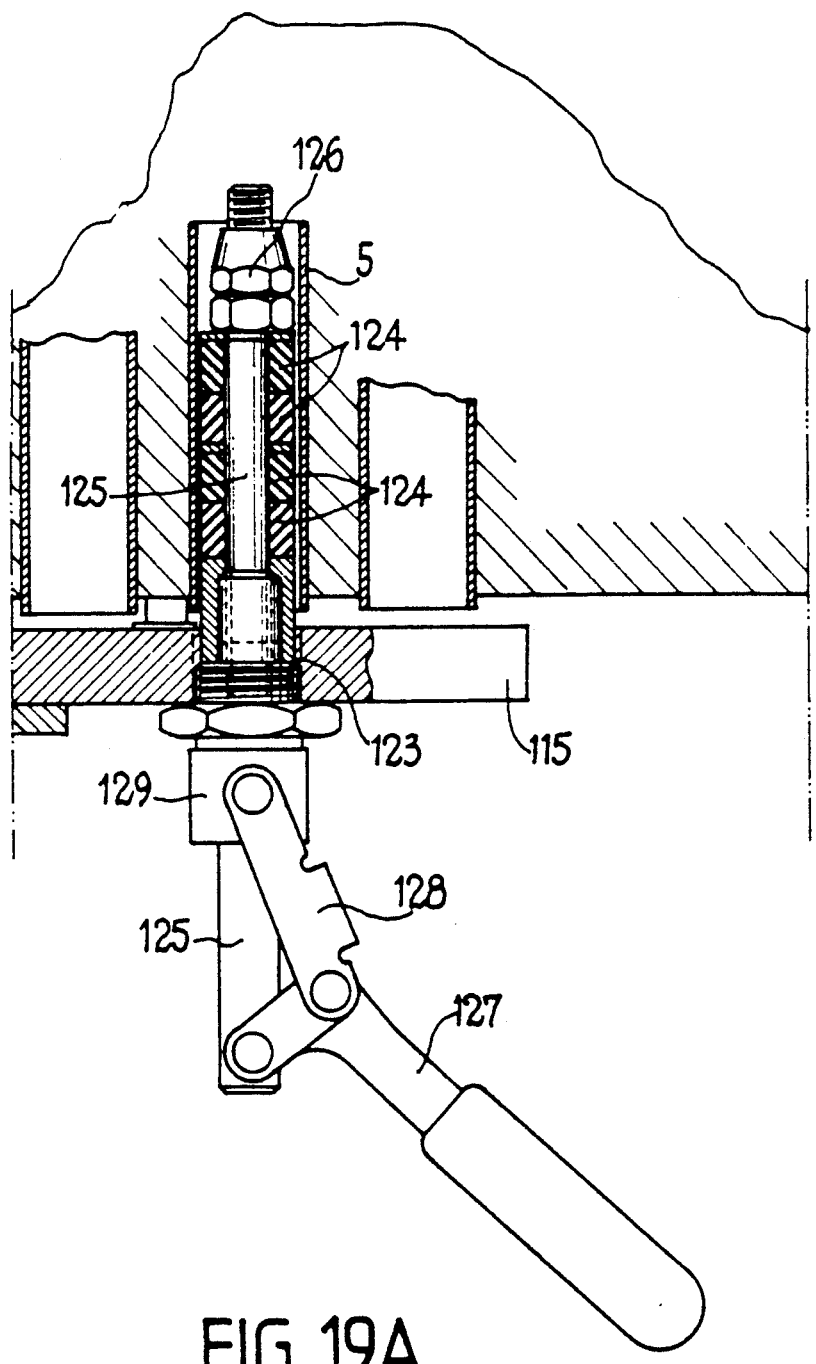
FIG_19A

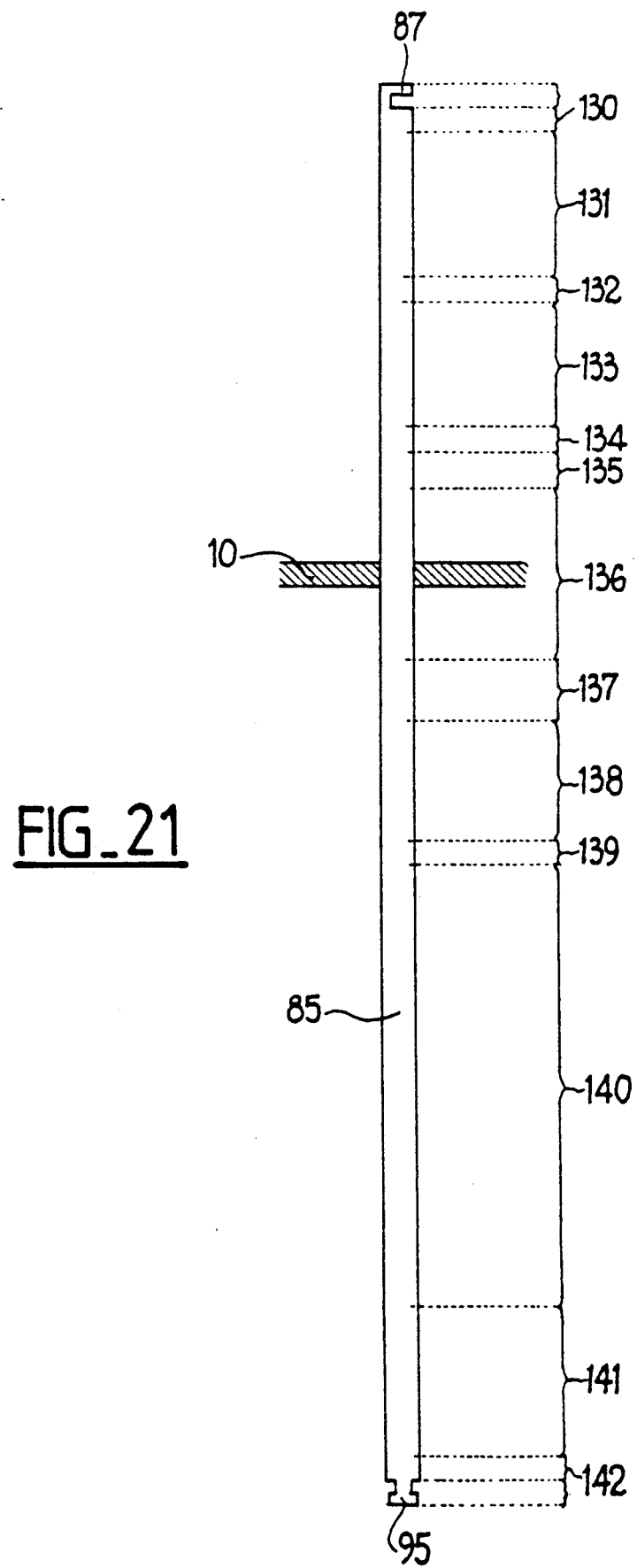
FIG_21

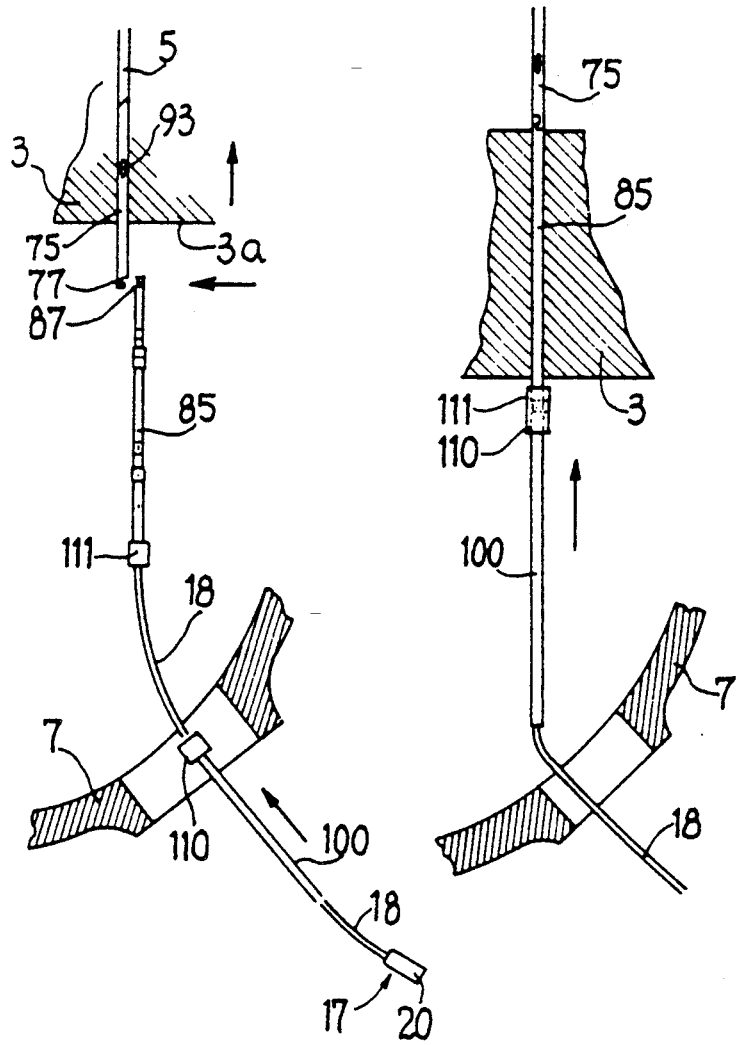
FIG_22A  FIG_22B  FIG_22C

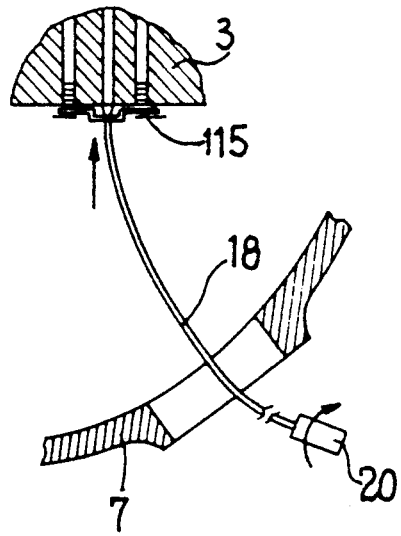 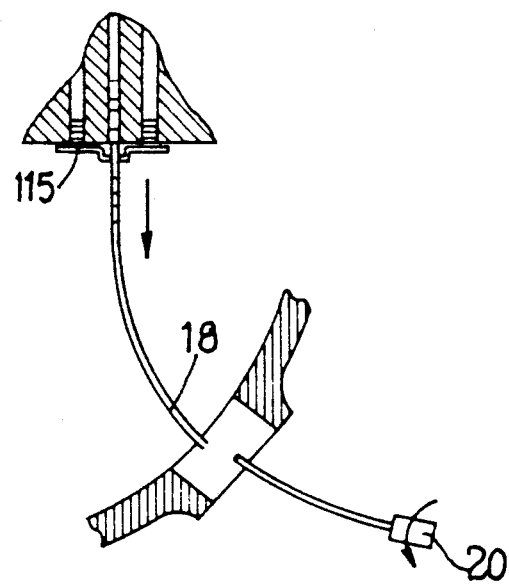
FIG_22D  FIG_22E

DEVICE FOR FITTING AN EXTRACTION SLEEVE INTO A STEAM-GENERATOR TUBE AND CORRESPONDING PROCESS FOR THE EXTRACTION OF A TUBE PORTION

FIELD OF THE INVENTION

The invention relates to a device for fitting an extraction sleeve into a steam-generator tube and to a process for the extraction of a tube portion, more particularly a tube portion remote from the ends of the tube.

BACKGROUND OF THE INVENTION

Heat exchangers, such as the steam generators of pressurized-water nuclear reactors, generally comprise a tube plate of great thickness, through which pass tubes which are flush with one of the faces of this tube plate forming its entry face and which project on the other side of the tube plate, the exit face of which is in contact with the interior of the steam generator receiving the feed water to be evaporated. The entry face of the tube plate opens into the inner volume of a two-part water box ensuring the distribution and recovery of the pressurized water circulating in the tubes and carrying the heat for the heating and evaporation of the feed water. Each of the steam-generator tubes, which is bent in its upper part, has two ends opening into the respective parts of the water box.

The tubes of the steam generator form a bundle and are fitted inside holes of suitable diameter which pass through the tube plate virtually over the entire thickness of this plate. The tube bundle arranged in that part of the steam generator delimited by the exit face of the tube plate is retained inside the casing of the steam generator by means of spacer plates arranged at uniform distances from one another over the height of the bundle and having a network of holes corresponding to the transverse positions of the tubes of the bundle.

During operation of the reactor, some zones of the tubes of the bundle are subjected to increased local corrosion both from the inner surface of the tube in contact with the pressurized water and from the outer surface in contact with the feed water. This increased corrosion is usually attributable to a concentration of high residual stresses or to the accumulation of corrosive products in contact with the outer surface of the tube.

In particular, the transition zone between the region of the tube deformed as a result of fitting inside the tube plate and the non-deformed region of the tube is subjected to accelerated corrosion attributable to the concentration of stresses and to the accumulation of corrosive products on the upper exit face of the tube plate.

When the maintenance of the steam generators of a nuclear reactor is carried out, the reactor being shut down, it is necessary to conduct checks of the tubes, especially in order to ascertain their corrosion resistance in the transition zone after a certain period of service. These checks may require the extraction of a tube portion surrounding the transition zone. This extraction is useful only if it can be carried out without any deformation or change of surface state of the tube in the zone to be inspected.

French Patent No. 2,591,744, assigned to the present applicant discloses a process and apparatus for the extraction of a heat-exchanger tube portion, making it possible to prevent any deformation of change or surface state of the tube portion to be extracted. The tube portion is previously separated from the rest of the tube by cutting the wall of the tube in a zone located at the upper end of the portion to be extracted. A sleeve is then inserted into the tube from the entry face of the tube plate and over such a length that the sleeve covers the tube over the entire passage through the tube plate and over the entire zone which will be inspected after the extraction of the tube portion. A junction between the tube and the sleeve is made in two zones located on either side of the zone to be inspected, by means of glue which creates a connection of high mechanical resistance between the inner surface of the tube and the outer surface of the sleeve. Finally, axial pull is exerted on the sleeve from that face of the tube plate with which the tube is flush, in order to extract the tube portion from the tube plate.

During extraction, the zone of the tube to be inspected is not subjected to any stress, the sleeve ensuring that this zone is bridged in its entirety.

The sleeve is fitted into the tube by means of a device comprising a glue-injecting syringe which is engaged and fastened in the sleeve in a desired position, before the sleeve is introduced into the tube. The sleeve has orifices to allow the glue to pass through in the two bonding zones, the spacing of which corresponds to the length of the zone of the tube to be inspected.

The sleeve and the syringe are introduced into the tube via the entry face of the tube plate and are then installed and retained in the desired position inside the tube during injection of the glue. The syringe is subsequently extracted from the sleeve before the glue has set completely.

When the glue has hardened sufficiently, a pull is exerted on the sleeve by means of a suitable device, so as to extract the tube portion from the tube plate.

The operations of fitting the sleeve and injecting the glue can be carried out by an operator from the water box of the steam generator.

The process and device described in French Patent No. 2,591,744 are entirely suitable for the extraction of a tube portion consisting of the end part of the tube fitted in the tube plate and the immediately adjacent part of the tube corresponding to the transition zone. In fact, in this case, the length of the sleeve is only very slightly greater than the thickness of the tube plate, and therefore the deflection within the water box is sufficient to allow the rigid assembly consisting of the sleeve and of the syringe to be introduced into the tube.

However, it may prove necessary to conduct the check of the tubes by extracting a portion not only in the transition zone, but also in zones more remote from the ends of the tube, for example in the region of the first spacer plate of the steam generator. In this case, the process and device described cannot be used because the extraction sleeve and the syringe forming a rigid assembly would have a considerable length incompatible with the possible deflection within the water box. This is especially true of large bends, i.e., of the tubes located furthest to the outside of the bundle, the hemispherical water box having a small height in line with these tubes.

To date, no process and apparatus is known for extracting a steam-generator tube portion in a zone remote from the ends of the tube, for example in the vicinity of a spacer plate for the retention of the bundle, in such a way as to preserve the state of the portion to be extracted and prevent any breakage of the tube during extraction as a result of cracking.

SUMMARY OF THE INVENTION

The object of the invention is, therefore, to provide a device for fitting an extraction sleeve into a steam-generator tube fastened by fitting in a tube plate by means of its end parts, so as to be flush with a first face or entry face of the tube plate and project relative to the second face, the tube portion to be extracted from the entry face of the tube plate, within a water box of the steam generator, first being separated from the remaining part of the tube by cutting in a zone remote from the ends of the tube and being provided internally, over at least some of its length, with an extraction sleeve which is fitted by means of a device comprising a glue-injecting syringe engaged and fastened in the extraction sleeve, in order to inject a glue between the sleeve and the tube in at least two zones, this device making it possible, from the waterbox of the steam generator, to carry out the fitting of an extraction sleeve in a zone of the tube remote from its ends, for example in the region of a spacer plate of the steam generator.

To this end, the fitting device according to the invention comprises at least one guide sleeve equipped, at one of its ends, with means for connecting it to corresponding means located at a first end of the extraction sleeve, a retention sleeve equipped, at one of its ends, with removable means of connection to corresponding means located at the second end of the extraction sleeve, means for fastening the retention sleeve to the entry face of the tube plate and, means for the installation of the extraction sleeve and for the installation, control and extraction of the injection syringe, comprising an actuating member and an elongate transmission element, the diameter of which is less than the inside diameter of the retention sleeve and which is connected at one of its ends to the injection syringe and at its other end to the actuating member.

The invention also relates to a process for the extraction of a steam-generator tube portion remote from the ends of the tube, which puts into practice the fitting device according to the invention.

BRIEF DESCRIPTION OF THE DRAWINGS

In order that the invention may be more clearly understood, an embodiment of the fitting device according to the invention and an example of the extraction process according to the invention will now be described by way of example, with reference to the accompanying drawings FIGS.

FIG. 7 is an elevation view of the extraction sleeve in position inside a tube of the steam generator.

FIG. 8 is a sectional view on a larger scale of the detail 8 of FIG. 7.

FIG. 9 is a view in axial section of the extraction sleeve.

FIG. 10 is a view along line 10—10 of FIG. 9.

FIG. 11 is a view along line 11—11 of FIG. 9.

FIG. 12 is a perspective view of the means of connection of the lower end part of the extraction sleeve.

FIG. 13 is an elevation view of the retention sleeve of the extraction device.

FIG. 14 is a view on a larger scale of the means of connection of the upper part of the sleeve shown in FIG. 13.

FIG. 15 is a sectional view along line 15—15 of FIG. 14.

FIG. 16 is a perspective view of the connection means located at the upper end of the sleeve shown in FIG. 13.

FIG. 17 is a sectional view of a flexible sleeve for protecting the end of the retention sleeve.

FIG. 18 is a sectional view of a flexible sleeve for protecting the lower end of the extraction sleeve.

FIG. 19 is a top plan view of a strap for fastening the retention sleeve to the tube plate.

FIG. 19A is an elevation view, partially in section, of a clamping element for the strap shown in FIG. 19.

FIG. 20 is a sectional view of a fastening sleeve for the retention sleeve.

FIG. 21 is an elevation view of a sleeve for the extraction of a tube portion in the region of the first spacer plate of the steam generator, with the various zones provided on this sleeve being indicated.

FIGS. 22A, 22B, 22C, 22D and 22E are schematic views showing the various phases relating to the fitting of an extraction sleeve into a steam-generator tube by the use of the device according to the invention.

DESCRIPTION OF PREFERRED EMBODIMENT

Figure 1:
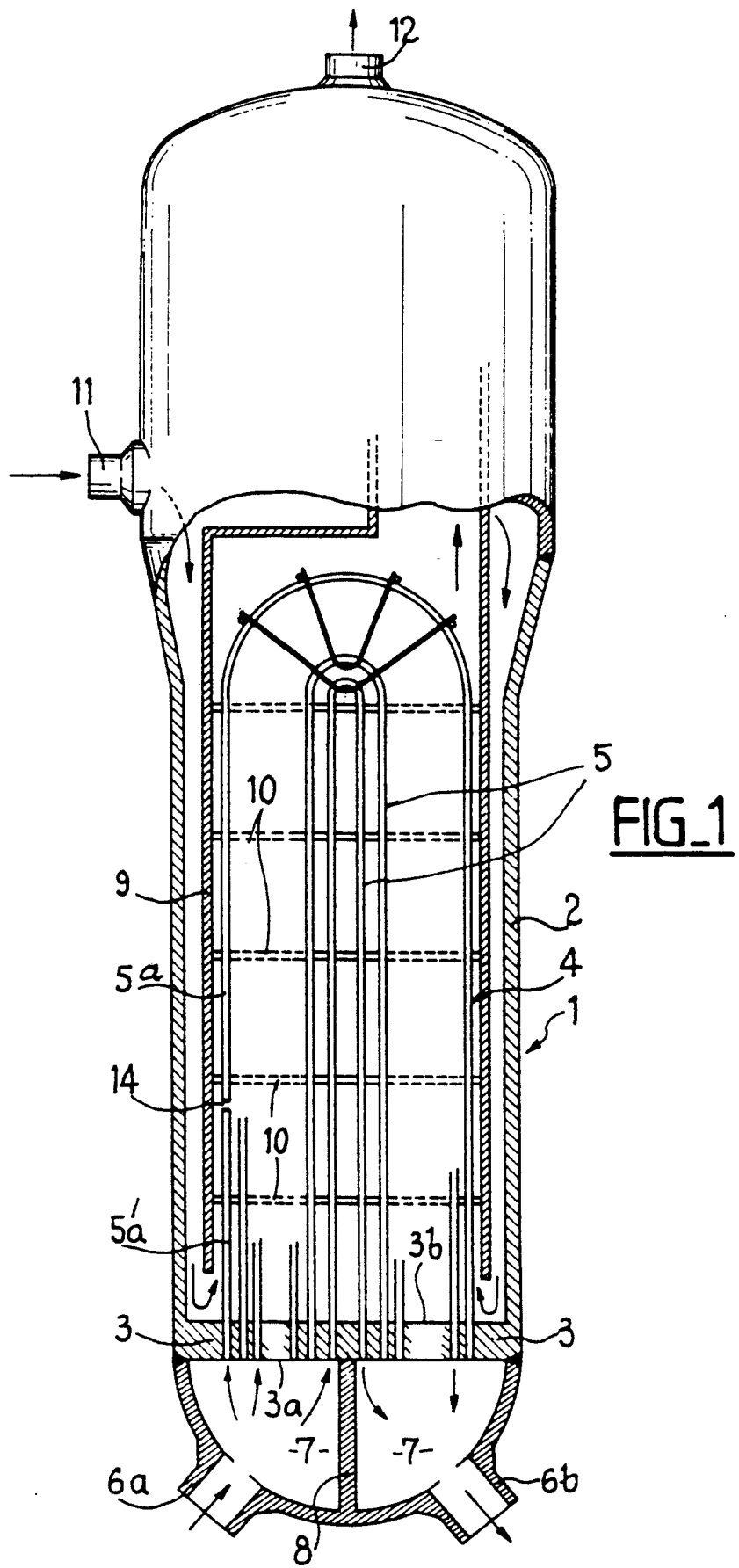
FIG. 1 is a front elevation, partially in section, of a steam-generator of a pressurized-water reactor, before the extraction of a tube portion located in the vicinity of the first spacer of the steam generator.

FIG. 1 shows a steam generator of a pressurized-water nuclear reactor 1 comprises a casing 2 of substantially cylindrical shape arranged with its axis vertical and, in its lower part, fixed to a tube plate of great thickness 3. The steam generator comprises a bundle 4 consisting of tubes bent in the form of a U, the ends of which are fastened in the tube plate 3. The tubes 5 of the bundle are flush with a first face 3a of the tube plate 3 forming its entry face and project relative to the other face 3b forming the exit face.

A water box 7 in two parts separated by a partition 8 is arranged under the tube plate 3 on the same side of its entry face 3a. On one side of the partition 8, the water box 7 has a connection 6a for the inflow of primary pressurized water into the water box and, on the other side of the partition 8, a connection 6b for the outflow of the primary water which has circulated through the tubes 5 of the bundle. Each of the tubes of the bundle has one end opening into the first part of the water box and its other end opening into the second part of the water box.

The bundle 4 is arranged inside a bundle casing 9 and is retained by means of spacers 10 arranged at uniform distances from one another over the height of the bundle. Feed water enters the outer casing 2 of the steam generator via a connection 11 and then circulates from top to bottom in the annular space reserved between the bundle casing 9 and the outer casing 2. The feed water reaches the base of the bundle, where it enters the bundle casing 9 so as to circulate in the vertical direction and from the bottom upwards in contact with the tubes of the bundle 4. The feed water is heated and then evaporated, during its rising flow, by the pressurized primary water circulating in the tubes 5 of the bundle. The steam formed is dried in the upper part of the steam generator and then recovered in a steam circuit in the region of the connection 12.

In FIG. 1, the steam generator is shown during a shutdown and maintenance phase, in the course of which the extraction of a portion 5'a of a tube 5a of the bundle is carried out, the upper end of the portion 5'a being located between the first two spacer plates 10.

Such an extraction makes it possible, in particular, to carry out an inspection of that zone of the tube 5a which, during operation, is located in the region of the first spacer 10 above the tube plate 3.

This operation of extracting the portion 5'a of great length can be carried out, without damage or deformation of the zone of the tube to be inspected in the vicinity of the first spacer plate 10, during the extraction. For this purpose, an extraction sleeve is fitted and fastened by adhesive bonding inside the tube portion 5'a in its zone adjacent to the tube plate 10, by use of a fitting device according to the invention which will be described herein below.

Before the fitting of the extraction sleeve, a cut is made in the tube wall in a zone 14 located between the first and second spacers. This cutting operation is carried out by means of a rotary cutting device inserted into the tube 5a via the water box of the steam generator.

Figure 2:
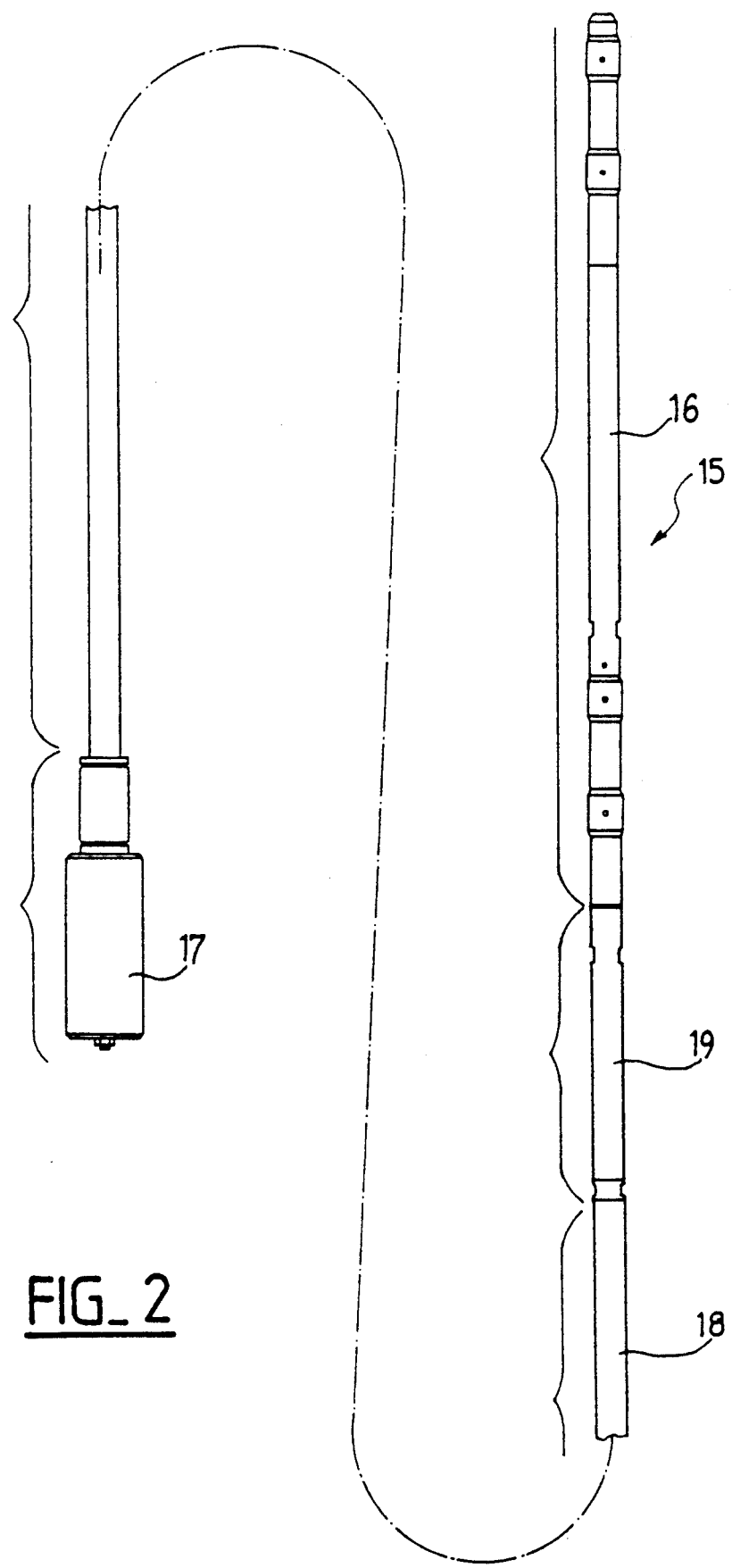
FIG. 2 is a general view of the injection syringe and of its control means.

The device according to the invention for the fitting of an extraction sleeve comprises a remote-controlled injection assembly 15, which can be seen in FIG. 2, and which comprises a syringe 16, a manual actuating member 17, a flexible elongate transmission element 18 and a means 19 for locking the syringe 16 inside an extraction sleeve.

The flexible transmission element 18, the length of which may be of the order of five meters, makes it possible to control the installation and bonding of the extraction sleeve from outside the water box.

Figure 3:
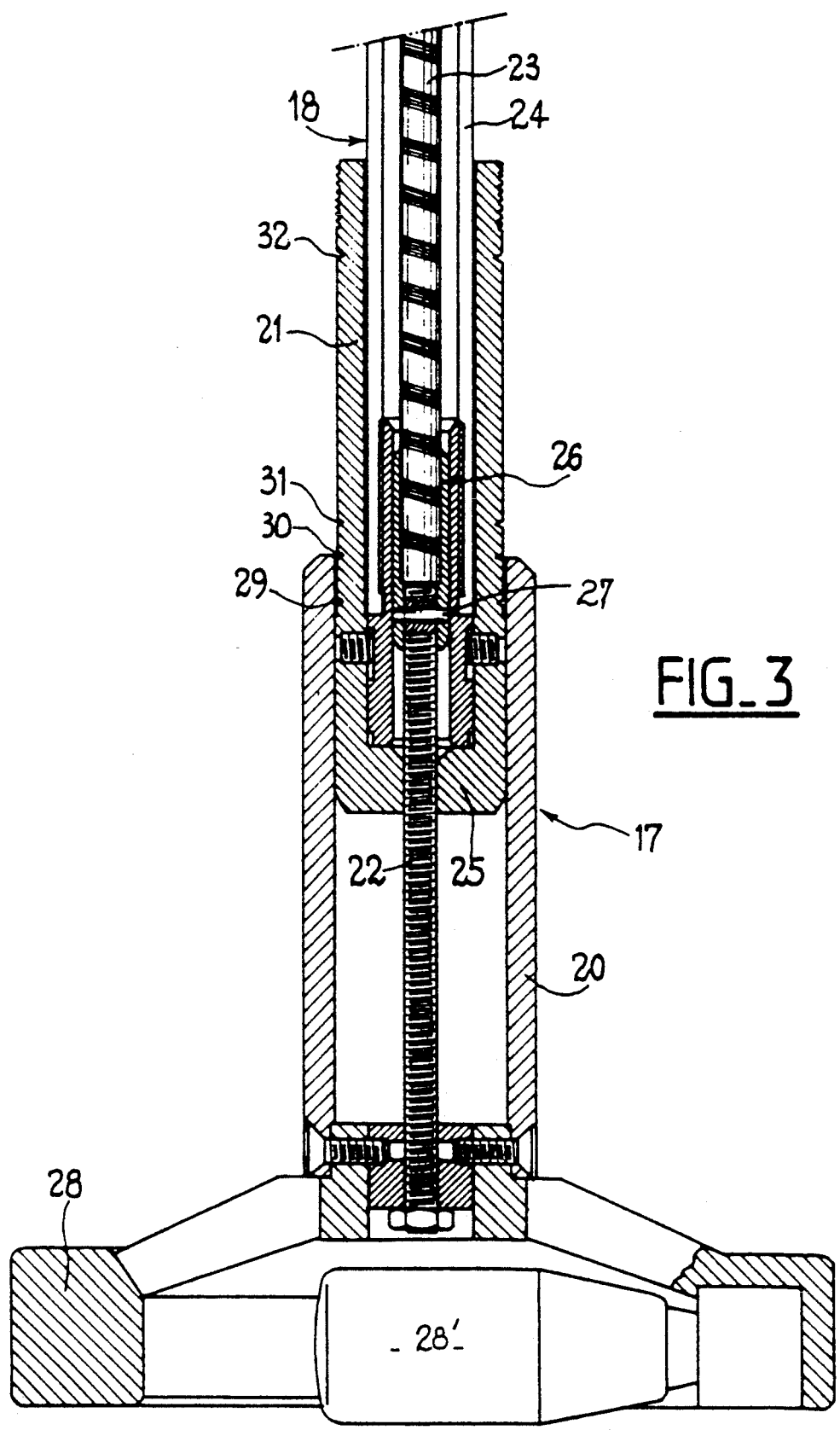
FIG. 3 is a view in axial section of the actuating member of the injection syringe.

In FIG. 3, the actuating member 17 of the injection assembly is seen connected to the transmission element 18, making it possible to carry out remotely the installation of the extraction sleeve and the control of the glue-injecting syringe.

The actuating member comprises a bush 20 mounted rotatably on a connector 21 and fixed to a control screw 22 arranged in the axis of the bush 20. Fastened to the end of the bush 20 is a handwheel 28 equipped with an operating handle 28' making it possible to rotate the bush 20 on the connector 21.

The elongate transmission element 18 consists of a hose 23 mounted inside a tubular sheath 24 in the axis of this sheath and with considerable play.

The end of the sheath 24 is fixed to the connector 21 which has a bottom 25 comprising an internally threaded hole in which the control screw 22 is engaged.

The end of the control screw 22 is fixed to the end of the hose 23 by means of a sleeve 26, in which the end of the hose 23 is crimped, and a pin 27 passing radially through the sleeve 26 and the screw 22.

When the bush 20 is rotated about its axis of the connector 21, the screw 22 engaged in the internally threaded hole in the bottom 25 of the connector 21 moves in axial translational motion, thereby driving the hose 23 movable inside the sheath 24.

The bush 20 simultaneously moves relative to the connector 21, and the position of the bush 20 relative to the connector 21 can be marked by means of notches 29, 30, 31 and 32.

Figure 4:
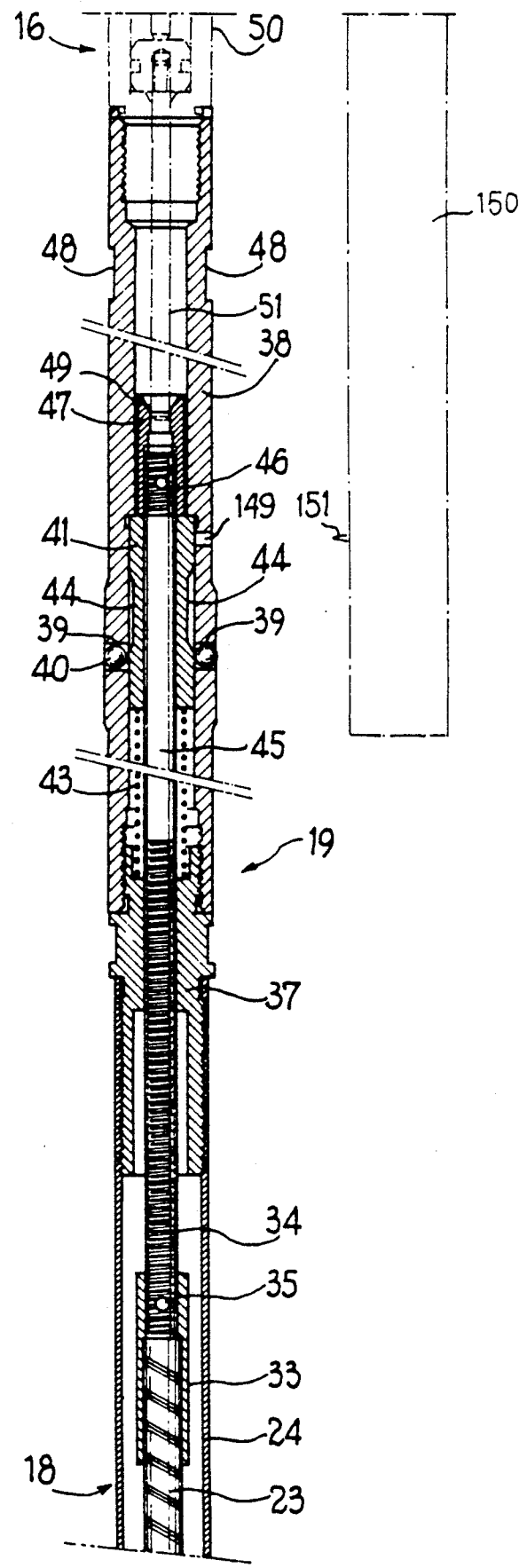
FIG. 4 is a view in axial section of that end of the transmission element which is connected to the injection syringe and opposite the actuating member.

The movements of the control bush 20 are transmitted by means of the hose 23 and the transmission element 18 over the entire length of the latter element which, as can be seen from FIG. 4, is connected, at its end opposite the actuating bush 20, to the locking means 19 of the injection syringe 16.

The end of the hose 23 is connected, by means of a sleeve 33, to the end of a screw 34 which is fastened by means of a pin 35. The screw 34 is engaged in a nut 37 fixed to the end of the sheath 24 of the transmission element 18.

The nut 37 also forms the connection between the transmission element 18 and a bush 38 forming the body of the lock 19. The bush 38 comprises two diametrically opposite radial orifices 39, into each of which is fitted a ball 40. A bush 41 forming the movable part of the lock 19 is mounted slidably in the bore of the bush 38, in which it is returned to the high position abutting a shoulder by means of a helical spring 43. The sliding bush 41 has two diametrically opposite axial incisions 44 in positions corresponding to those of the radial orifices 39 and balls 40 of the lock.

The position of the sliding bush 41 shown in FIG. 4 corresponds to the locking of the syringe obtained when the handle is in the position shown in FIG. 3, its upper end being level with the notch 30. In this position, the balls 40 are pushed outwards by the lateral surface of the bush 41 and project slightly in the radial direction relative to the outer surface of the bush 38.

As will be explained later, the extraction sleeve comprises orifices, into which the balls 40 engage in order to ensure that the syringe 16, the body of which is fastened to the end part of the bush 38, is blocked inside the extraction sleeve.

The upper part of screw 34 is extended beyond the nut 37 by a smooth rod 45 passing axially through the bore of the bush 41 and connected, by means of a threaded part and a pin 46, to a control bush 47 mounted slidably in the bore of the bush 38 and, as shown in FIG. 4, capable of coming to bear on the upper end of the bush 41.

From the locking position in which the control bush 47 bears on the locking bush 41, it is possible to change to a release position by actuating the operating handle in the unscrewing direction, in order to change from the position represented by notch 30 to the position represented by notch 29.

This movement of the operating handle gives rise, via the hose 23, the screw 34 and the smooth rod 45, to a downward movement of the control bush 47, which causes a corresponding movement of the bush 41. The balls 40 come into line with the axial incisions 44, thus allowing them some radial clearance within the cavities 39 and therefore ensuring the release.

When the operating handle is actuated in the screwing direction from the position marked by the notch 29, the control bush 47 is moved upwards via the hose 23, the screw 34 and the smooth rod 45. At the same time, the locking bush 41 returned upwards by the spring 43 accompanies the bush 47 and brings its solid part located below the incisions 44 into position opposite the balls 40, when the handle reaches the locking position. The device is then retained in the position shown in FIGS. 3 and 4.

The bush 38 forming the body of the lock has two flaps 48 in diametrically opposite positions, making it possible to block the lock 19 against rotation when the end of the body of the injection syringe 16 is screwed onto the end of the lock 19.

The upper part of control bush 47, opposite its part connected to the rod 45, has a cylindrical bore 49 terminating in an upwardly open widened frusto-conical part.

The end part of the rod 51 of the syringe mounted slidably in the syringe body 50 engages into the bore 49 of the bush 47 when the device is in the locking position, as shown in FIG. 4. By moving the operating handle 20 in the screwing direction, starting from the position designated by notch 31, the end of the rod 51 is brought to bear on the bottom of the bore 49. The position 31 corresponds to the start of injection, i.e., to the start of the axial translational movement of the rod 51 in the body 50.

The bush 47 causes axial translational movement of the rod 51 simply as a result of the bearing of the end of the rod 51 on the bottom of the bore 49. The end of the rod 51 is mounted in the bore 49 with slight friction, with the result that the rotation of the rod 45 and of the bush 47 is not transmitted to the rod 51.

Figure 5:
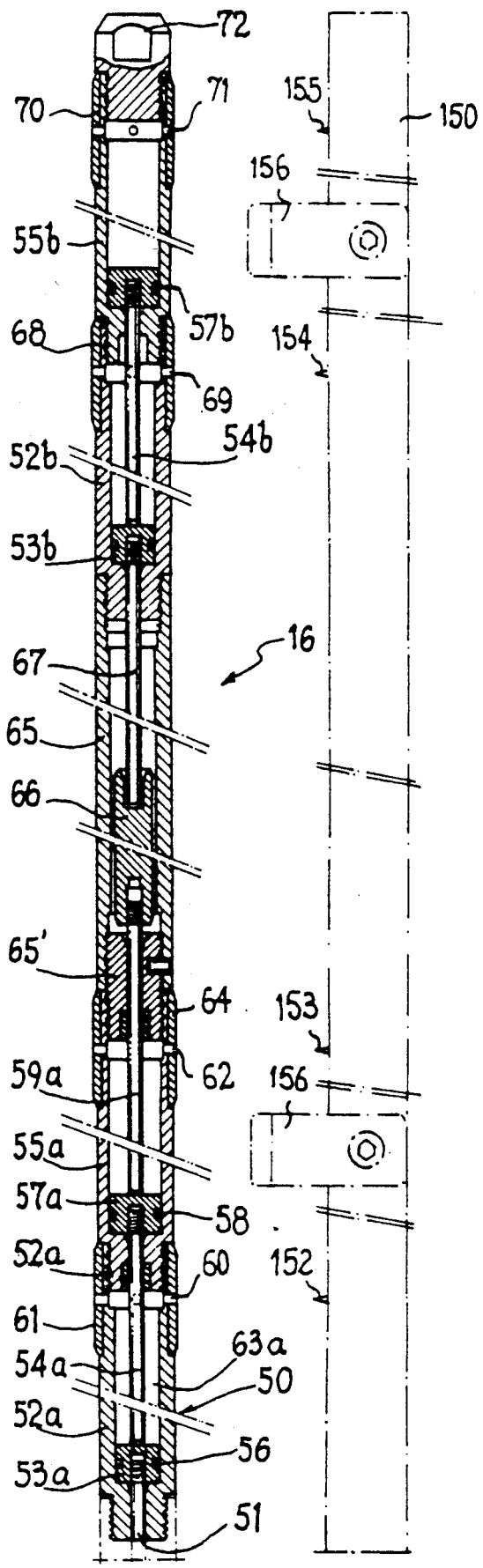
FIG. 5 is a view in axial section of the injection syringe.

FIG. 5 is a general view of the injection syringe 16 of the fitting device according to the invention, this body 50 and rod 51 consisting of successive portions which can be joined together at the time of the filling and assembly of the syringe.

The syringe 16 comprises a lower sealant-injecting assembly, a lower glue-injecting assembly, an upper sealant-injecting assembly and an upper glue-injecting assembly.

Each of the injection assemblies comprises a cylinder, in which moves a piston equipped with gaskets.

The successive cylinders of the various assemblies and tubular connecting pieces form the body of the syringe, while the various connecting rods of the pistons form the rod of the axially movable syringe 51.

The lower sealant-injecting assembly comprises a cylinder 52a, in which is mounted a piston 53a equipped with a gasket 56 and connected, on the one hand, to that part of the rod 51 coming to bear in the bore 49 of the bush 47 and, on the other hand, to a connecting rod 54a forming part of the rod 51 of the syringe.

The lower glue-injecting assembly comprises a cylinder 55a, in which is mounted a piston 57a equipped with a gasket 58. The piston 57a is connected to the end of the rod 54a and to a connecting rod 59a.

The lower part of the cylinder 55a forms a guide bearing for the rod 54a. The cylinder 55a is screwed to an internally threaded part of the cylinder 52a. A plastic sleeve 61 having orifices 60 for the passage of sealant is arranged round the junction zone between the cylinders 52a and 55a, in such a way that the orifices 60 communicate with the chamber 63a of the cylinder 52a which contains a sealant capable of being injected during the upward movement of the piston 53a.

The cylinder 55a, at its end opposite the cylinder 52a, is screwed to a piece 65' forming a sliding bearing, itself connected by means of a radial screw to the lower part of a tubular connecting piece 65.

The rod 59a is mounted slidably in the bearing 65' and, at its end opposite the piston 57a, is connected to a connecting piece 66, to which is fastened a rod 67 for connection to the piston 53b of the upper sealant-injecting assembly.

A plastic sleeve 64 having orifices 62 for the passage of glue is arranged round the upper part of the cylinder 55a, in such a way that the orifices 62 communicate with the chamber of the cylinder 55a which contains a glue capable of being injected during the movement of the piston 57a.

The upper sealant-injecting assembly comprises a cylinder 52b and a piston rod 54b connected to the piston 53b.

The cylinder 52b is screwed to the cylinder 55b of the upper glue-injecting assembly. A sleeve 68 having holes 69 for the passage of sealant is fastened round the junction zone between the cylinders 52b and 55b. This upper glue-injecting assembly also includes a piston 57b connected to the end of the rod 54b. The lower part of the cylinder 55b forms a sliding bearing for the rod 54b.

Mounted round the upper part of the cylinder 55b is a sleeve 70 having orifices 71 for the passage of glue. The upper end of the cylinder 55b is closed by means of a profiled plug 72 making it possible to ensure the sealing closure of the cylinder 55b by screwing. The plug 72 also makes it possible to engage a clamping tool onto the syringe in order to fasten it by screwing in the threaded upper part of the bush 38 of the lock 19.

The cylinders are filled with the sealant and the glue at the time of assembly of the injection syringe, the various parts forming the body 50 and rod 51 of this syringe being joined together after filling, the pistons being in their low position, as shown in FIG. 5.

The lower injection assemblies and the upper injection assemblies are assembled separately, these assemblies subsequently being joined together.

The syringe as a whole is then screwed to the upper part of the lock and kept in a vertical position.

Figure 6:
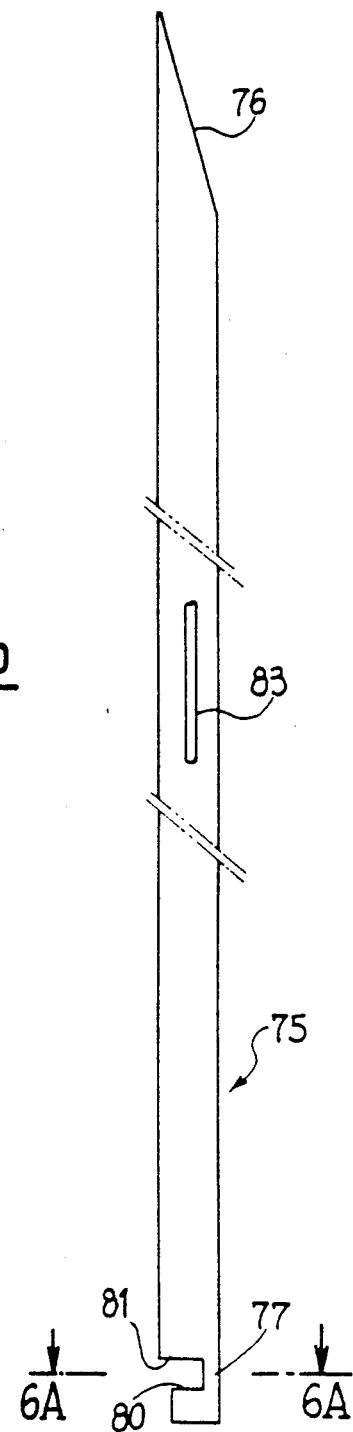
FIG. 6 is an elevation view of the guide sleeve of the fitting device.
Figure 6A:
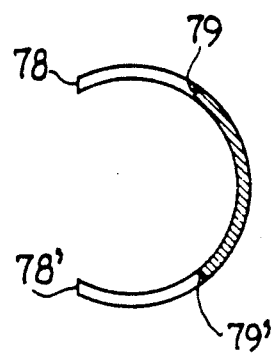
FIG. 6a is a view along line 6A—6A of FIG. 6.

FIGS. 6 and 6a show the upper guide sleeve of the fitting device according to the invention. This guide sleeve 75 consists of a simple tube which has, in its upper part, a bevelled part 76 forming an angle of 30° with the axis of the sleeve 75 and, at its lower end, a fastening profile 77 intended for making the connection between the guide sleeve 75 and the extraction sleeve.

As can be seen in FIG. 6a, to obtain the fastening profile 77 the trunk 75 is cut at its end along four generatrices 78, 78', 79 and 79' and along two cross-sections 80 and 81 in the form of a sector and in the form of an arc of a circle, respectively.

A middle zone of the guide trunk 75 comprises a slot 83 making it possible to display the cutting 14 of the tube to be extracted by means of a miniaturized camera introduced via that end of the tube opposite the end at which the extraction is carried out.

FIGS. 7 and 8 show an extraction sleeve 85 in the position which it occupies inside a tube portion 5a, in the vicinity of the first spacer 10 of the steam generator, at the moment of extraction.

The extraction sleeve 85 consists of a tube, the diameter of which is identical to that of the tube of the upper guide sleeve 75. This diameter is slightly less than the inside diameter of the tube 5a of the steam generator.

The upper part of sleeve 85 has a connecting profile 87 matching the profile 77 cut in the lower part of the sleeve 75. The profiles 77 and 87 can be engaged into one another before they are introduced into the tube of the steam generator.

When the guide trunk and the extraction sleeve have been introduced into the tube 5, the sleeve 75 and the sleeve 85 are fixed against translational movement relative to one another and can no longer be separated, their separation requiring a sufficient radial clearance.

The extraction sleeve 85 has two sealant-injection zones 88a and 88b which have been shown on a large scale in FIG. 8. Each of the zones 88a or 88b is delimited by two sealing rings 89 and 90, each consisting of an annular deposit of hard chrome on the outer surface of the sleeve 85. Between the rings 89 and 90, the wall of the sleeve 85 is pierced with four orifices 91 arranged at 90° relative to one another about the axis of the sleeve 85.

The thickness of the hard-chrome rings 89 and 90 corresponds substantially to the play present between the inner surface of the tube 5 and the outer surface of the sleeve 85.

When the sleeve 85 is installed in the tube 5, as shown in FIG. 7, the rings 89 and 90 ensure a virtually complete closure of the annular space located above the sleeve 85 in the zone 88a or 88b.

Furthermore, the extraction sleeve 85 includes two sets of two diametrically opposite holes 92a and 92b which pass through the wall of the sleeve 85 above the zone 88a and above the zone 88b, respectively.

That zone of the tube to be protected during extraction is located approximately between the holes 92a and the zone 88b on either side of the spacer plate 10.

The sleeve 85 also has two holes 93 passing through its wall in diametrically opposite positions below the zone 88a.

Finally, the lower end of the sleeve 85 opposite the connecting profile 87 comprises a connecting device 95, the structure of which will be described herein below.

FIGS. 9, 10, 11 and 12 illustrate the end parts of the sleeve 85, and, as can be seen FIGS. 9 and 10, the upper end part 87 has a cutout forming a fastening profile matching the profile 77 of the guide trunk 75.

The connecting device 95, which can be seen in the lower part of FIG. 9 and in FIGS. 11 and 12, comprises two T-shaped catching fingers 96a and 96b, each comprising, in their lower part, an inclined engagement surface 97a (or 97b), a radially directed lateral edge 98a (or 98b) and a bevelled lateral edge 99a (or 99b).

The mutually opposite edges 99a and 98b (or 98a and 99b) of the two fingers are of different types.

FIGS. 13, 14, 15 and 16 show the upper part of the lower retention sleeve 100 of the fitting device, having a connection means matching the means 95 located in the lower part of the extraction sleeve 85.

The lower retention sleeve 100 consists of a tube the diameter of which is identical to the diameter of the tube of the extraction sleeve.

The upper part of the sleeve 100 has four slits 101 arranged along generatrices of the sleeve 100 and delimiting, in the wall of the sleeve 100, two cylindrical sectors, to each of which is connected a T-shaped catching finger 102a or 102b of a connecting device 105 intended for interacting with the device 95 of the extraction sleeve in order to make the connection between these two tubular pieces.

The T-shaped catching fingers 102a and 102b are limited in their end part by bevels and each have a laterally radially directed engaging part 106a or 106b and a bevelled engaging part 107a or 107b.

The retention sleeve 100 can be joined to the extraction sleeve 85 by engaging the attaching fingers 102a and 102b of the device 105 between the fingers 96a and 96b of the device 95 as a result of the elasticity afforded by the slits 101.

The T-shaped fingers slide into receptacles of corresponding shape formed between the T-shaped fingers of the corresponding connecting device.

The junction is such that the radial bearing parts 98a and 98b located on the main branch and on the secondary branch of the fingers of the first device come opposite the radial parts 106a and 106b of the corresponding branches of the T's of the second connecting device 105.

Likewise, the bevelled parts 99a and 99b come opposite the corresponding bevelled parts 107a and 107b.

It is clear that by rotating one sleeve relative to the other in a first direction, the radial parts are brought in contact with one another, the sleeves being fixed relative to one another against rotation about their axis, in this first direction of rotation.

In the other direction, the bevelled parts come in contact with one another, and the fingers move aside so as to break the junction between the sleeve 100 and the sleeve 85.

The sleeve 85 and the sleeve 100 are fixed relative to one another against axial translational movement when they are joined together.

FIGS. 17 and 18 respectively show a sleeve 110 and a sleeve 111 made of Plexiglas, intended to engage onto the upper part of the retention sleeve 100 having the connecting device 105 and onto the lower part of the extraction sleeve 85 having the connecting device 95.

The sleeves 110 and 111 have O-ring gaskets 112 and 113 in their part respectively receiving the upper end of the retention sleeve and the lower end of the extraction sleeve.

As will be described, these devices are used especially for protecting the connecting devices 95 and 105 which could easily be deformed and damaged at the moment when the fitting device is mounted on the tube plate, with the result that there would be the risk of malfunctioning of these connecting devices for assembling or dismantling the sleeves.

FIGS. 19 and 20 show the elements making it possible to fasten the retention sleeve of the fitting device during the bonding of the extraction sleeve.

These elements comprise a strap 115 having a central orifice 116, in which a sleeve 117 shown in FIG. 20 can be mounted.

The sleeve 117 has holes 118 intended for receiving screws 119 for fastening it on the strap 115.

A central bore 120 passes through the sleeve 117 over some of its length and terminates in a shoulder 121. The diameter of the bore 120 is slightly larger than the diameter of the retention sleeve 100 which can be engaged into the bore 120 so as to come to rest on the shoulder 121.

The strap 115 also has four through-holes 122, the spacing of which corresponds to the spacing of the holes for the passage of the tubes of a steam generator through the tube plate.

The end of the retention sleeve 100 can be engaged into the bore 120 and the strap 115 can be fastened under the tube plate by means of conventional elastic clamping devices, such as those shown in FIG. 19a. Such clamping devices comprise a stack of elastic washers 124, through which passes an actuating rod 125 having a threaded part receiving clamping nuts 126.

Articulated on the end of the rod 125 opposite the nuts 126 is a lever 127 which is connected by means of a link 128 to a body 129 in which the rod 125 is mounted slidably. The body 129 can come to bear on the lower face of the strap 115 round an orifice 122, into which the rod 125 and the elastic washers 124 are engaged. The orifices 122 are brought into line with the entry ends of the tubes of the stream generator, so as to introduce the elastic washers into the corresponding tubes 5.

The strap 115 is fastened relative to the tube plate by turning the lever 127 down towards the strap 115, thus exerting a pull on the rod 125 and causing an expansion of the elastic washers 124 inside the tube 5 and consequently the fastening of the strap 115 against the entry face 3a of the tube plate 3.

FIG. 21 illustrates an extraction sleeve 85 schematically, in order to show the various functional zones of the sleeve along its length.

The sleeve 85 has been shown in the position which it occupies inside a steam-generator tube, of which a portion in the vicinity of the first spacer 10 is to be extracted.

The end parts of the sleeve 85 consist of the connecting devices 87 and 95 which were described above.

Between these devices 87 and 95, the extraction sleeve 85 comprises in succession a first clearance zone 130, a hydraulic expansion zone 131, a free zone 132, a bonding zone 133, a sealing zone 134, a second free zone 135, a protection zone 136 corresponding to that zone of the tube to be preserved during extraction, a third free zone 137, a second bonding zone 138, a second sealing zone 139, a fourth free zone 140, a second hydraulic expansion zone 141 and a second clearance zone 142.

The hydraulic expansion zones are designed to ensure the fastening of the expansion sleeve in the tube when it has not been possible to carry out the extraction.

The position of the bonding and sealing zones is determined by the position of the injection syringe when the latter is introduced into the extraction sleeve 85. This position is determined very accurately by means of the locking device, of which the balls 40 in their projecting locking position come to rest in the holes 93 of the sleeve 85. This locking also ensures the orientation of the injection syringe 16 in relation to the sleeve 85, in such a way that the sealant and glue injection holes are aligned with the holes 91 and with the holes 92a and 92b, respectively.

The fitting of an extraction sleeve by the use of the device according to the invention and the extraction of a tube portion in the vicinity of the first spacer plate of a steam generator will now be described with reference to FIGS. 22A to 22E.

In the first place, tests of assembling and dismantling the assembly consisting of the sleeves, of the extraction sleeve and of the injection fringe are carried out outside the steam generator by using a test tube, the inside diameter of which is identical to the inside diameter of a tube 5 of the bundle of the steam generator.

First, a check is made that the engagement of the connecting device 77 of the guide sleeve 75 with the corresponding device 87 of the extraction sleeve can be carried out without difficulty.

Subsequently, a check is made that the engagement of the connecting device 95 of the extraction sleeve 85 with the corresponding device 105 of the lower retention sleeve can also be carried out without difficulty.

The injection syringe 16 is engaged and installed inside the extraction sleeve 85 via the interior of the retention sleeve 100, in such a way that the flexible transmission element 18 is engaged into the sleeve 100 while, remaining outside the sleeve over a certain length at its end opposite the extraction sleeve 85. The actuating bush 20 connected to the end of the flexible transmission element 18 remains outside the sleeve 100.

The injection syringe 16 is installed in the extraction sleeve and locked in its operating position by means of the locking device 19, the balls 40 of which come to rest in the holes 93 of the sleeve 85.

The guide sleeve, the extraction sleeve and the retention sleeve are installed in the test tube, and a check is then made that the device 19 is operating correctly. The release of the injection syringe is controlled by the handle 20 connected to the end of the flexible transmission element 18.

A check is also made that the retraction of the injection syringe 16 through the extraction sleeve 85 and the retention sleeve 100 can be carried out without catching.

In a second phase, the syringe is assembled and filled with sealant and glue.

Various cylinders of the injection syringe 16 are then filled, care being taken to ensure that, before filling, the corresponding pistons are in their low positions.

The spacer 65 (FIG. 5) is screwed to the upper cylinder 52b. The lower cylinder 55a is then filled with glue, and subsequently the cylinder 52a is filled with sealant and joined by screwing to the glue cylinder 55a. The lower assembly 52a, 55a, is thereafter joined to the body 38 of the lock 19.

The upper cylinder 55b is filled with sealant and then closed by means of the plug 72.

The upper cylinder 52b is filled with glue, and then this cylinder is joined to the cylinder 55b.

Finally, the complete assembly of the injection syringe 16 is carried out.

It is then ensured that all the sealant and glue injection holes are in correct position, both as regards their orientation about the axis of the syringe and in the axial direction, by using the template 150 provided for this purpose and illustrated in FIGS. 4 and 5. The template 150 has a lower marker 151 to be aligned with a hole 149 in the body of the lock 19 (FIG. 4) and markers 152, 153, 154 and 155 to be aligned with sealant and glue injection holes 60, 62, 69 and 71 respectively (FIG. 5). The template 150 also comprises two retaining yokes 156.

The injection syringe 16 is subsequently introduced into the extraction sleeve 85, and the balls 40 of the lock are oriented so as to bring them opposite the holes 93 in the sleeve 85.

Locking is carried out by rotating the control bush 20. A check is made that the locking functions correctly, and then the sleeve 111 shown in FIG. 18 is attached onto the end of the sleeve 85 having the connecting device 95.

All these operations and tests are carried out outside the water box.

After the injection syringe 16 has been filled, it is necessary to keep the assembly consisting of the syringe and of the extraction sleeve in a vertical position.

The assembly consisting of the injection syringe and of the sleeves is subsequently installed in the water box of the steam generator.

The tube to be extracted has previously been cut and cleaned, and the various operations are carried out manually from inside the water box.

The upper guide sleeve is introduced into the tube to be extracted, and then the upper connecting device 87 of the extraction sleeve 85 is brought level with the corresponding connecting device 77 of the upper guide sleeve 75, as can be seen in FIG. 22A.

The fastening of the extraction sleeve 85 to the lower part of the sleeve 75 is carried out, and then the lower retention sleeve 100 is slipped onto the flexible element 18 until the sleeves 110 and 111 are up against one another; the retention sleeve 100 is fastened to the lower end of the extraction sleeve 85, and the sleeves 110 and 111 are then disconnected by sliding them along the sleeve 100. The device as a whole is moved upwards until the bevelled upper part of the sleeve 75 enters the zone of the cut 14 of the tube 5.

To make it easier for the guide trunk to pass in to the cutting zone, a quarter-turn rotation of the fitting device is effected manually from inside the water box (the arrow 150 in FIG. 22C).

The installation of the fitting device is completed by sliding it into the tube portion 5a to be extracted and into the remaining part of the tube above the cut 14, until the lower end of the retention sleeve 100 comes level with the entry face 3a of the tube plate 3.

The sleeve 117 shown in FIG. 20 is then engaged on the end of the retention sleeve 100, and then the strap 115 is itself engaged and fastened on the end of the sleeve 117.

The fastening of the strap 115 under the face 3a of the tube plate is carried out by means of clamping devices, as shown in FIG. 19A.

The fitting device is then in the configuration shown in FIG. 22D.

The fitting device as a whole is then kept in a perfectly exact position inside the tube 5.

The sealant seals and the glue are then injected, the actuating bush 20 being screwed as far as its limiting position.

The seals are formed by injecting the sealant contained in the cylinders 52a and 52b through the corresponding orifices located opposite the orifices 91 in the extraction sleeve 85. The sealant retained between the hard-chrome rings 89 and 90 thus forms two seals in the lower part and in the upper part of the injection syringe, below the glue injection zones. The glue contained in the cylinders 55a and 55b is injected through the corresponding orifices located opposite the orifices 92a and 92b in the extraction sleeve 85. The glue fills the annular space between the sleeve 85 and the tube 5, above the seals formed by the sealant in the zones 88a and 88b of the extraction sleeve 85.

The retraction of the injection syringe 16 is then carried out, after the device 19 has been released by unscrewing the bush 20 completely (FIG. 22E).

The retraction of the syringe 16 is obtained by pulling on the flexible element 18.

The injection syringe 16 is usually extracted without difficulty, since the glue has not yet set at the moment of extraction. If there is jamming during the retraction of the injection syringe, an emergency procedure can be put into practice.

After the syringe has been extracted, a check is made that the pistons of the injection assemblies are definitely in their end position and that, consequently, the reserves of glue in their entirety have indeed been injected between the extraction sleeve and the tube.

During the retraction of the injection syringe and during the drying of the glue, the extraction sleeve is kept perfectly in place by the lower retention sleeve and by the strap fastened under the tube plate.

After a drying period which may be of the order of twelve hours, it is possible to remove the strap 115 and separate the connecting devices 95 and 105 of the lower sleeve and the extraction sleeve. This separation can be carried out by rotating the retention sleeve 100 about its axis and to the left, the effect of this being to put the bevelled parts of the T-shaped catching fingers in contact with one another. This allows the fingers to escape and ensures the separation of the sleeve 85 and the sleeve 100.

It is then possible to carry out the extraction of the portion of the tube 5a by means of a conventional device, a pull being exerted on the tube from the entry face 3a of the tube plate.

During its extraction, the portion of the tube 5a is perfectly protected and does not undergo any deformation or damage in the zone adjacent to the first spacer 10, this being bridged by means of the extraction sleeve 85.

To ease the extraction in the zones of the water box allowing a slight vertical clearance, it is possible to cut again the parts of the tube which have already been extracted, in order to continue the extraction.

If the retraction of the injection syringe cannot be carried out completely because of jamming inside the lower retention sleeve, an emergency procedure described below is put into practice.

The injection syringe is pushed upwards so as to free it completely from the lower retention sleeve, this freeing position being controlled by means of a reference mark provided on the flexible element 18 which is located in line with the strap 115 when the injection syringe is in the desired position.

The injection syringe is kept in this position, and the retention sleeve is replaced by releasing the strap 115 and removing it, then by separating the retention sleeve 100 from the extraction sleeve 85, and finally by removing the retention sleeve. The retention trunk is replaced by an emergency sleeve consisting of two tubular sectors formed by a tube cut along two generatrices, the two sectors subsequently being brought opposite one another in order to form the emergency sleeve. The retaining strap 115 is put back in place and locked under the tube plate. The retraction of the injection syringe is then carried out.

The tube portion 5a can then be extracted as before, the zone to be inspected being preserved completely.

The invention thus makes it possible to carry out the extraction of a tube portion of a steam generator remote from the ends of this tube, for example a tube portion located in the vicinity of a spacer, without causing any damage or deformation of this tube which is bridged by means of an extraction sleeve bonded in two zones located on either side of the zone of the tube to be protected.

The extraction sleeves and guide and retention sleeves may have forms different from the ones described.

With other types of connecting devices. The same is true of the devices for locking and installing the injection syringe.

The device can be used to carry out the extraction of a tube portion located at any height in the stream generator, for example in the region of an upper spacer plate. This purpose is served by using a retention sleeve in several sections joined end to end and installed in sequence in the tube of the steam generator, until the extraction sleeve is in the desired position.

It is also possible to use a retention sleeve consisting of a tubular elongate element made of a flexible material, such as a plastic, carrying at its end removable means of connection to the corresponding means of the extraction sleeve.

The invention can thus be used for extracting any straight portion of a steam generator tube, whatever the position of this portion.

I claim:

1. Device for fitting an extraction sleeve into a steam-generator tube fastened by crimping in a tube plate by means of its end parts, so as to be flush with a first, entry face of the tube plate and to project relative to a second face of the tube plate, a tube portion to be extracted from the entry face of the tube plate, inside a water box of the steam generator, first being separated from the remaining part of the tube by cutting in a zone remote from ends of the tube and being equipped internally, over at least a part of a length of said tube portion, with an extraction sleeve which is installed by means of a device comprising a glue-injecting syringe engaged and fastened in the extraction sleeve, in order to inject a glue between the extraction sleeve and the tube in a least two zones, the device further comprising
   (a) at least one guide sleeve equipped, at one end of said guide sleeve, with means of connection to corresponding means located at a first end of the extraction sleeve;
   (b) a retention sleeve consisting of a flexible elongate element equipped, at one of its ends, with means of removable connection to corresponding means located at a second end of the extraction sleeve;
   (c) means for fastening the retention sleeve to the entry face of the tube plate; and
   (d) means for installation of the extraction sleeve and for installation, control and extraction of the injection syringe, said means comprising an actuating member and an elongate transmission element having a diameter less than an inside diameter of the retention sleeve and being connected at one of its ends to the injection syringe and at its other end to the actuating member.

2. Fitting device according to claim 1, wherein the elongate transmission element is connected to the injection syringe by means of a locking device for locking the injection syringe in operational position inside the extraction sleeve.

3. Fitting device according to claim 2, wherein the elongate transmission element consists of a hose arranged in the axis of a flexible sheath, the locking device consisting of a tubular lock body and of a movable lock part slidably mounted in the lock body between a locking position, as a result of a radial extraction of balls placed in radial orifices of the lock body, and a release position allowing the balls to be retracted towards the axis of the lock body, the movable lock part being movable between its locking position and its release position by means of a driving element driven in axial translational movement by the hose of the elongate control element.

4. Fitting device according to claim 3, wherein the driving element movable in the axial direction has a bearing surface for the end of a rod slidably mounted in a syringe body and carrying an assembly of injection pistons movably mounted in corresponding cylinders forming elements of the syringe body.

5. Fitting device according to claim 3, wherein the actuating member consists of a handle mounted rotatably and movably in axial translation on a bush and fixed to a screw which is arranged along the axis of the bush and is engaged in an internally threaded orifice of the bush and which, at its end opposite the handle, is fixed to the end of the hose.

6. Fitting device according to claim 3, wherein the driving element is fixed to a first end of a rod having a second end connected to the end of the hose opposite the actuating member, the rod being threaded over a portion of its length and interacting with a nut fixed to the sheath of the elongate control element, in order to drive the driving element in a helical movement inside the lock body by means of the hose.

7. Fitting device according to claim 1, wherein the connection means of the guide sleeve and of the extraction sleeve consist of parts of corresponding shape cut out in end portions of the guide sleeve and of the extraction sleeve, respectively, these cut-out parts being connectable as a result of engagement in the radial direction.

8. Fitting device according to claim 1, wherein the removable connection means of the extraction sleeve and of the retention sleeve consist of T-shaped parts cut out from the wall of the end of the extraction sleeve and of the retention sleeve, the T-shaped cut-out parts comprising a first set of mutually opposite surfaces of radial direction and a second set of mutually opposite surfaces having a direction inclined relative to the radial direction and forming a bevel, so that the extraction sleeve and the retention sleeve are fixed relative to one another in terms of rotation in one direction and are separable as a result of the sliding of the bevelled surfaces on one another in the other direction.

9. Fitting device according to claim 1, wherein the means for fastening the retention sleeve to the entry face of the tube plate consist of a plate having removable means of fastening in the tubes of the steam generator and a receiving sleeve fastened to the plate in the region of an orifice with lateral clearance for receiving the end of the retention sleeve.

10. Fitting device according to claim 1, wherein the guide sleeve comprises, at an end of the guide sleeve opposite the end provided with the means for connection, a bevelled part facilitating its introduction into the cut-out zone of the tube.

11. Fitting device according to claim 1, wherein the injection syringe comprises two sealant-injecting cylinders spaced in the axial direction of the injection syringe and two glue-injecting cylinders arranged adjacent to and above the sealant-injecting cylinders, in the operating position of the syringe.

* * * * *